United States Patent
Evans

(10) Patent No.: US 6,587,606 B1
(45) Date of Patent: Jul. 1, 2003

(54) WAVEGUIDE FIBER DISPERSION COMPENSATING REGENERATOR

(75) Inventor: Alan F. Evans, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 98 days.

(21) Appl. No.: 09/974,533

(22) Filed: Oct. 9, 2001

Related U.S. Application Data

(60) Provisional application No. 60/242,249, filed on Oct. 20, 2000.

(51) Int. Cl.[7] .............. G02B 6/26; G02B 6/42; G02B 6/00; G02B 6/02; H04B 10/00

(52) U.S. Cl. .............. 385/15; 385/27; 385/39; 385/122; 385/123; 359/341.1; 359/341.3; 359/348; 359/160; 359/337.5

(58) Field of Search .............. 385/15, 27, 39, 385/122, 123; 359/160, 161, 337.5, 341.1, 341.3, 348

(56) References Cited

U.S. PATENT DOCUMENTS

| | | | |
|---|---|---|---|
| 4,962,987 A | | 10/1990 | Doran .............. 350/96.15 |
| 5,404,413 A | * | 4/1995 | Delavaux et al. .............. 385/15 |
| 5,477,555 A | * | 12/1995 | Debeau et al. .............. 372/25 |
| 5,532,863 A | * | 7/1996 | Liedenbaum et al. ........ 359/176 |
| 5,617,434 A | | 4/1997 | Tamura et al. .............. 372/6 |
| 5,655,039 A | * | 8/1997 | Evans .............. 385/27 |
| 5,717,797 A | | 2/1998 | Evans .............. 385/27 |
| 5,857,040 A | * | 1/1999 | Bigo et al. .............. 385/15 |
| 5,911,015 A | | 6/1999 | Bigo .............. 385/1 |
| 6,396,607 B1 | * | 5/2002 | Cao .............. 359/158 |
| 6,498,886 B1 | * | 12/2002 | Sobiski et al. .............. 385/122 |
| 2002/0159730 A1 | * | 10/2002 | Watanabe .............. 385/122 |

FOREIGN PATENT DOCUMENTS

WO  WO 98/36512  8/1998  .......... H04B/10/00

OTHER PUBLICATIONS

N.J. Doran et al., Nonlinear–Optical Loop Mirror, Optical Letters, vol. 13, No. 1, Jan. 1988, pp. 56–58.

T. Yu, et al., Dispersion–Managed Soliton Interactions in Optical Fibers, Optical Letters, vol. 22, No. 11, Jun. 1, 1997, pp. 793–795.

E.A. Golovchenko et al., Collision–Induced Timing Jitter Reduction by Periodic Dispersion Management in Soliton WDM Transmission, Electronic Letters, vol. 33, No. 9, Apr. 24, 1997, pp. 735–737.

F. Favre et al., 320 Gbit/s Soliton WDM Transmission Over 1300KM with 100KM Dispersion–Compensated Spans of Standard Fibre, Electronics Letters, vol. 33, No. 25, Dec. 4, 1997, pp. 2135–2136.

M. Nakazawa, et al., Marked Increase in the Power Margin Through the use of Dispersion–Allocated Soliton, IEE Photonics Technology Letters, vol. 8, No. 8, Aug. 1996, pp. 1088–1090.

* cited by examiner

Primary Examiner—Brian Healy
Assistant Examiner—Tina M Lin
(74) Attorney, Agent, or Firm—Mary Y. Redman

(57) ABSTRACT

Disclosed is a dispersion compensating optical regenerator that provides for enhanced performance of telecommunication systems employing varying-soliton signal propagation and dispersion compensation. Allowing the solitons to change in amplitude, width and shape while traversing the dispersion compensating optical regenerator provides for beneficial system performance including improved signal to noise ratio at the receiver, reduced impact of signal interactions, and longer regenerator spacing. The regenerator in accord with the invention combines the filtering features of a NOLM or NALM with the advantageous effects of dispersion compensation.

22 Claims, 2 Drawing Sheets

WAVEGUIDE FIBER DISPERSION COMPENSATING REGENERATOR

CROSS-REFERENCES TO RELATED APPLICATIONS

This application claims the benefit of and priority to U.S. Provisional Patent Application No. 60/242,249, filed Oct. 20, 2000.

BACKGROUND OF THE INVENTION

1. Field of the Invention

The present invention relates generally to a signal regenerator for use in an optical communication system, and particularly to such a regenerator that combines dispersion compensation with the saturable absorption properties of a nonlinear optical loop mirror or a nonlinear amplifying loop mirror.

2. Technical Background

The concept of dispersion management emerged early in the development stages of optical waveguide systems. Dispersion management is enabled by the property of waveguides fibers that allows adjustment of the waveguide dispersion by alteration of the optical waveguide fiber refractive index profile. In particular, the waveguide dispersion can be made to substantially cancel, i.e., subtract from, the material dispersion to provide a waveguide fiber having a total dispersion near zero over an extended wavelength range. The total dispersion of a waveguide fiber (also called the chromatic dispersion or the group velocity dispersion) is the algebraic sum of the waveguide dispersion and the material dispersion of the optical waveguide fiber. The convention in the art is to assign a positive value to total dispersion if the total dispersion causes light of shorter wavelength to travel at a higher speed in the fiber in comparison to the speed of longer wavelength light. Conversely; negative total dispersion causes light of longer wavelength to travel at higher speed in the fiber.

The waveguide dispersion can be altered to provide waveguide fibers that have a zero dispersion wavelength at any point in a wide wavelength range. For example zero dispersion wavelength of a waveguide fiber can be placed anywhere in the range from 200 nm to 2000 nm. In addition, the slope of the total dispersion can be made positive or negative essentially independently of the placement of the zero dispersion wavelength. These capabilities allow dispersion compensation to be achieved by altering the sign of the total dispersion along the length of an individual waveguide fiber. Further, dispersion compensation can be achieved on an overall system basis by forming the system of positive and negative waveguide fibers. The accumulated dispersion of a system is determined by adding the dispersion products of the waveguides that make up the system length and dividing by the total system length. The dispersion product of a waveguide fiber is defined as the total dispersion of the waveguide fiber in ps/nm-km multiplied by the length of the fiber.

As a valuable adjunct to dispersion management is the optical amplifier, which is used to manage attenuation. Dispersion management combined with optical amplification raises the possibility of a dispersion and attenuation free system, having repeater spacing limited only by spontaneous noise from the amplifiers, frequency chirping of the signal source, and non-linear optical effects.

A signal regenerator module that, in addition to compensating dispersion and attenuation, also removed spontaneous noise, pulse timing jitter, and reduced or eliminated non-linear effects would serve to greatly decrease system cost by preserving signal pulse integrity in systems having larger regenerator spacing than is possible with present systems using standard regenerators.

Recent theoretical and experimental (PCT WO 98/36512; Golovchenko et al, Electronics Letters, v. 33, n. 9, p. 73, (1997); Nakawaw, et al, IEEE Photonics Technology Letters, v. 8, n. 8, p. 1088, 1996; F. Favre. Et al, Electronic Letters, v. 33, n. 25, p. 2135, (1997); T. Yu, Optics Letters, v. 22, n. 11, p. 793, (1997)) work in dispersion managed systems employing a return-to-zero (RZ) format for soliton signals has shown that allowing the RZ soliton signals to alternately broaden in highly dispersive optical waveguide fiber of one sign and then contract in highly dispersive optical waveguide fiber of the other sign has a beneficial impact on overall signal integrity. For example, the RZ soliton signals could broaden in positive dispersion optical fiber and then contract in negative dispersion optical fiber. In particular in varying-soliton signals, timing jitter due to amplified spontaneous emission (ASE) is reduced, signal-to-noise-ratio in the receiver (SNR) is improved, the impact of discrete amplifier power perturbations is reduced, and the deleterious effects of signal collisions or multi-wavelength signal interactions is reduced.

An opportunity therefore exists to exploit this advantageous combination in systems using an RZ format. Furthermore, the combination can be configured to further enhance the beneficial effect on the varying-soliton signals.

SUMMARY OF THE INVENTION

Throughout this application the term varying-soliton(s) is used to describe RZ (return to zero) signal pulse(s), i.e., soliton pulses whose amplitude, width, or shape are caused to vary along at least a portion of the waveguide fiber, in particular along the waveguide fibers of the dispersion compensating optical regenerator in accord with the invention. This designation of varying-soliton distinguishes the signal pulses of the present application from those that propagate in systems designed to maintain ideal, i.e., invariant, soliton signals. It also distinguishes the signal pulses of the present application from non-return-to-zero pulses used in commercial systems today.

One aspect of the present invention is a dispersion compensating optical regenerator for use in a waveguide fiber telecommunications system. This passive optical component combines the functions of dispersion compensation with signal regeneration, where signal regeneration includes recovering signal amplitude and shape. The dispersion compensating optical regenerator system comprises a positive total dispersion waveguide fiber for the transmission fiber and a negative total dispersion waveguide fiber for dispersion compensation, where the negative dispersion waveguide fiber is a part of a non-linear optical loop mirror (NOLM) or a non-linear amplifying loop mirror (NALM). The respective positive and negative total dispersion waveguide fibers have respective lengths and total dispersion magnitudes selected to provide a pre-selected amount of dispersion compensation. In particular, the waveguide fiber dispersion products, i.e., the product obtained by multiplying fiber total dispersion by fiber length, of the respective waveguide fibers are added algebraically. The respective fiber lengths and dispersions are chosen such that the magnitude of the algebraic sum is made to fall within a desired range.

An advantageous range is one that does not include zero, thereby limiting resonant non-linear phenomenon of four wave mixing. Another advantageous range choice is one in which the algebraic sum is positive, thereby allowing for formation and propagation of soliton pulses. The invention is particularly suited for use in varying-soliton transmission as will be pointed out in the detailed description below. The upper limit of the algebraic sum should be small to limit dispersion power penalty. Thus a preferred range of total average dispersion of the system is 0.01 to 5.0 ps/nm-km and a more preferred range is 0.1 to 1 ps/nm-km.

In an embodiment of this first aspect of the invention, the phase shifting means is an asymmetrical coupler that divides the signal pulses into counter-propagating pulses having different amplitude. The higher amplitude pulses corresponding to one of the propagation directions will undergo a larger phase shift due to self phase modulation.

In another embodiment, the respective amplitudes of the counter-propagating pulses are made asymmetric by an optical amplifier asymmetrically placed along the length of the optical waveguide fiber comprising the loop mirror. An alternative statement of the asymmetric placement of the optical amplifier is that the length of the fiber of the loop mirror coupled to one port of the amplifier is different from the length coupled to the other port of the amplifier. In this case the optical amplifier has two ports, one for signal input and one for signal output, where the ports are symmetrical in that either port can be the input or output port. The optical amplifier can be selected to amplify the varying-soliton signals coupled out of the loop mirror to an extent that the insertion loss due to the loop mirror (signal power lost in traversing the loop mirror) is compensated. This selection of amplifier obviates the need for a post-loop-mirror-amplifier sometimes used to compensate loop mirror insertion loss.

In either of the above embodiments, a polarization controller coupled in series with the waveguide fiber of the loop mirror can be used to insure that low intensities come out the input of the central coupler, i.e., are reflected, while high intensities come out the output of the central couple, i.e., are transmitted. A polarization controller is known to produce a linear phase shift in signals passing therethrough such that it controls the fiber port through which the signal exits the loop.

In any of the preceding embodiments, a phase shift of 180 degrees ($\pi$ radians) between the counter-propagating signals is desirable, because the 180 degree phase shift insures maximum signal power is coupled out of the loop mirror.

In a further embodiment of this first aspect of the invention the phase shifting means can be selected from the group consisting of an asymmetrical coupler or an asymmetrically placed optical amplifier, either a discrete erbium-doped fiber amplifier (EDFA) or a Raman optical amplifier. Any combination of these phase shifting means can be used to obtained the desired phase shift, which in most systems is a 180 degree ($\pi$ radians) phase shift. For example, an EDFA could be used together with an asymmetrical coupler, where the amplifier could be used to compensate for too high or two low an asymmetric power division of the signals by the coupler.

Asymmetric Raman amplification is created in the fiber loop by coupling pump light into the loop fiber in only one direction near the central coupler. Amplification is highest where the pump power is greatest. In fact, Raman gain in units of decibels is directly proportional to pump power in linear units of Watts.

In an embodiment of this first aspect of the invention, the optical waveguide fiber of the loop mirror is selected to have a negative total dispersion in the range of −70 ps/nm-km to −100 ps/nm-km. Preferably the negative dispersion waveguide fiber of the loop mirror has an effective area in the range 20 $\mu m^2$ to 40 $\mu m^2$ and a non-linear refractive index not less than 2×10$^{-20}$ m$^2$/Watt, where the watt refers to the signal pulse power. More preferably the negative total dispersion of the fiber of the loop mirror is in the range −80 ps/nm-km to −90 ps/nm-km, the effective area is in the range 20 $\mu m^2$ to 30 $\mu m^2$, and the non-linear refractive index is in the range 2.5 m$^2$/W to 4 m$^2$/W.

A further embodiment of the invention includes an optical preamplifier coupled to the regenerator to increase the amplitude of signals propagating from the preamplifier to the loop mirror such that the signal amplitude in the loop mirror is above the threshold amplitude at which the signal undergoes self phase modulation.

In another aspect, the present invention is an optical waveguide telecommunication system which includes a signal transmitter optically coupled to a signal receiver by means of an optical waveguide fiber. Incorporated in series arrangement into the waveguide fiber is a dispersion compensating optical regenerator as set forth in the first aspect of the invention. The telecommunications system is particularly suited to varying-soliton pulse propagation because of the features of the dispersion compensating optical regenerator.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
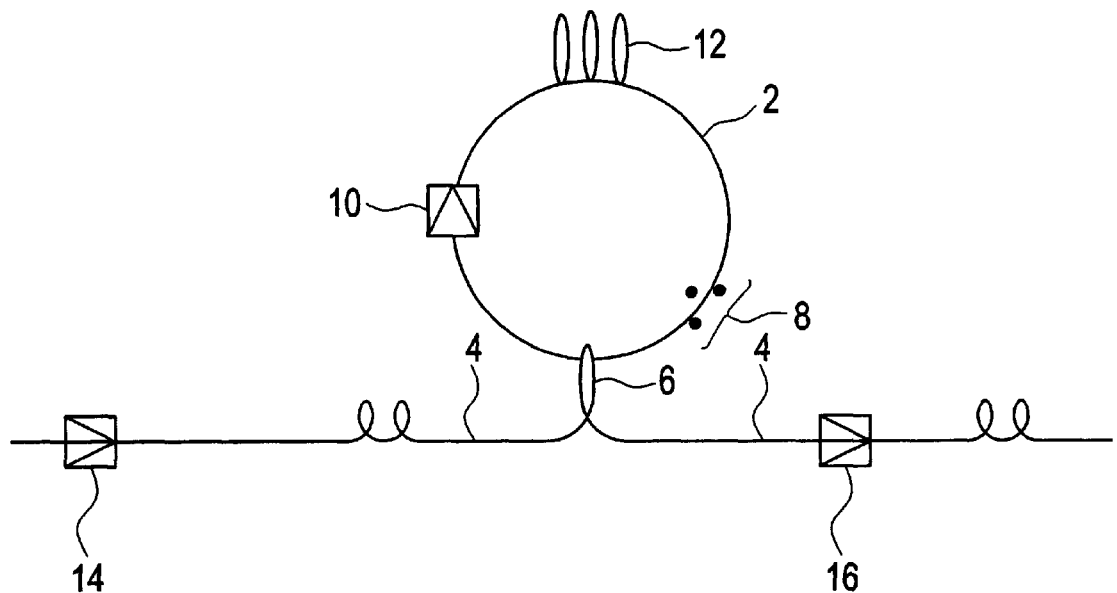
FIG. 1 and FIG. 2 are schematic illustrations of embodiments of the dispersion compensating optical regenerator in accord with the invention.

Reference will now be made in detail to the present preferred embodiments of the invention, examples of which are illustrated in the accompanying drawings. An exemplary embodiment of the dispersion compensating optical regenerator of the present invention is shown in FIG. 1.

In accord with the invention, the dispersion compensating optical regenerator is installed following a first optical waveguide fiber 4 having positive dispersion. Optical wavelength fiber 4 is the transmission fiber span. The length of fiber 4 is measured from the output port of intensity dependent coupler 6 to the input port of the next intensity dependent coupler of the nearest NOLM or NALM and is typically 60 to 100 km. A NOLM as defined in this document includes coupler 6, negative total dispersion fiber 2 and an optional signal polarization controller 8. A NALM configuration is illustrated in FIG. 1 and incorporates the features of the NOLM and further includes optical amplifier 10, which is asymmetrically located along loop fiber 2. It will be understood that fiber 2 included in the dispersion compensating optical regenerator in accord with the invention is typical single mode optical waveguide fiber. However the dispersion compensating optical regenerator can include waveguide fibers which support more than one mode for at least a part of the fiber length. For example, a fiber transmitting the fundamental mode and 2 or 3 higher order modes may be employed in the regenerator in accord with the invention.

Figure 2:
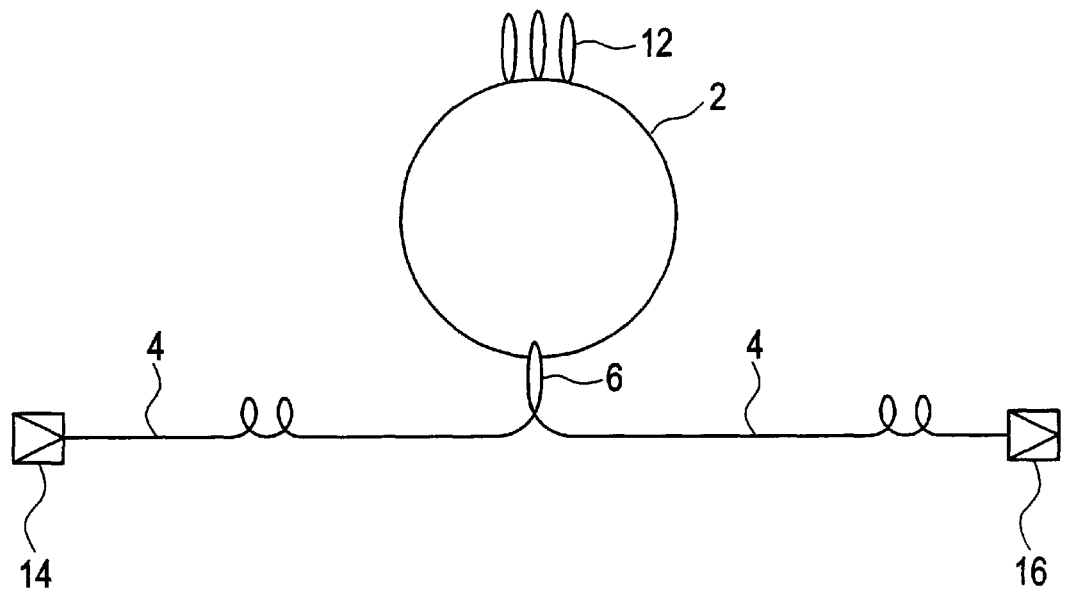

FIG. 2 illustrates the simplest form of NOLM, which includes loop fiber 2 (extra length of fiber 2 being illustrated by fiber loops 12) and asymmetrical coupler 6'. The relative phase shift between the counter-propagating varying-soliton signals of the NOLM is due to the asymmetry of coupler 6', which divides the pulses into counter-propagating pulses of different amplitude. Coupler 6 of the NALM of FIG. 1 may be symmetric or asymmetric because other phase shifting means, i.e., an asymmetrically placed optical amplifier and an optional polarization controller, are incorporated into the NALM.

In either the NOLM or NALM configuration, pulses propagating in positive total dispersion waveguide fiber 4 are amplified at optional preamplifier 14 and proceed to respective intensity dependent couplers 6 or 6'. Preamplifier 14 is required in those cases for which the signal pulse amplitude is below the signal amplitude needed for self phase modulation, the non-linear phenomenon which acts together with the linear dispersion of the fiber to form varying soliton pulses. Preamplifier 14 can also be designed to lower the overall noise figure of the optical regenerator by acting as a low-noise preamplifier.

Figure 3:
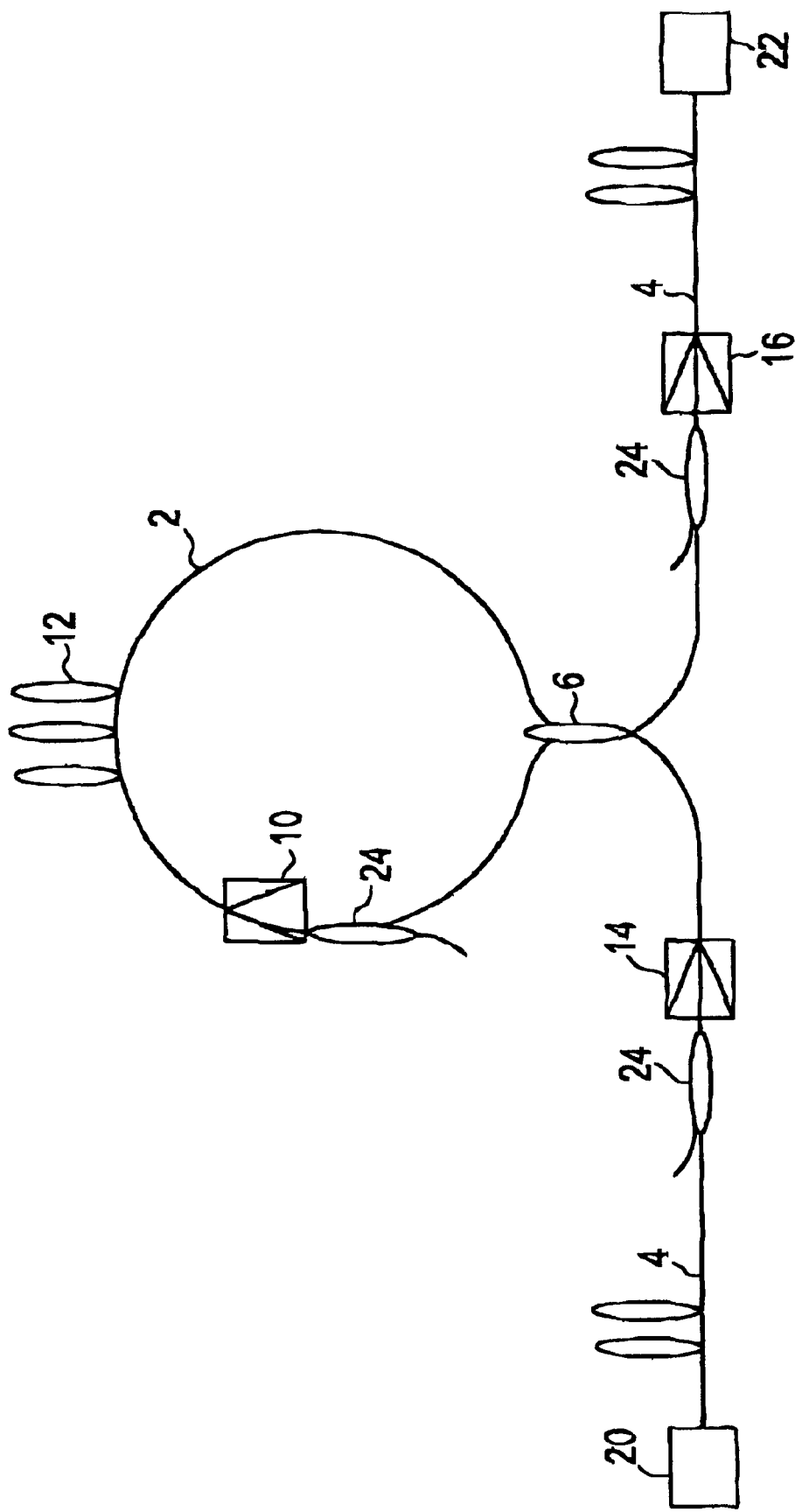
FIG. 3 is a schematic illustration of a telecommunications system incorporating a dispersion compensating optical regenerator in accord with the invention.

Referring now to the NALM of FIG. 1, coupler 6 splits the signal pulses into counter-propagating pulses in loop fiber 2. The loop fiber 2 has a length measured from the input to the output port of coupler 6. The loops 12, which appear in each of FIGS. 1, 2, and 3, schematically represent extra length of fiber 2 so that the length of fiber 2 will not to be construed as the circumference of the loop of fiber shown in the figures. The counter-propagating pulses arrive back at coupler 6 after having undergone a relative phase shift in traversing fiber 2 of the NALM. If the counter-propagating pulses have undergone a relative phase shift of $\pi$ radians, they will interfere constructively at coupler 6 and be coupled out of the loop into the positive total dispersion fiber 4 that is a part of the next transmission fiber span. The signal power coupled out of the loop mirror decreases as the relative phase shift deviates farther and farther from the ideal relative phase shift of $\pi$ radians. Post-amplifier 16 compensates for signal power lost in traversing the loop mirror and sets the launch power into the next transmission fiber 4. Post-amplifier 16 is not needed if loop amplifier 10 is chosen to compensate for signal power lost in traversing the loop mirror and the pre-amplifier compensates for the loss of fiber 4

Pulses propagating in the NALM of FIG. 1 or in the NOLM of FIG. 2 having an amplitude too small to undergo a relative phase shift sufficiently close to $\pi$ radians to couple out of the NALM or NOLM are reflected at respective couplers 6 or 6' and so are separated from the signal coupled out of the NALM or NOLM. Thus ASE and lower amplitude wavelengths making up the signal pulse tails will be reflected in the NALM or NOLM. The NALM serves to amplify and reshape the signal pulses propagating therethrough. The NOLM reshapes the pulses propagating therethrough and the amplification function is carried out by pre- or post-amplifiers.

The full benefit provided by the dispersion compensating optical regenerator in accord with the invention can be understood by tracking the RZ varying-soliton signal pulse width as the signal traverses the dispersion compensating optical regenerator. Referring to FIG. 2, a varying-soliton, is coupled into positive dispersion waveguide fiber 4 either from a light source or the output of a dispersion compensating optical regenerator upstream of fiber 4. As the pulse becomes attenuated by losses in fiber 4, the pulse will increase in width due to the increasing imbalance between self phase modulation and linear dispersion of fiber 4. Upon being amplified and coupled into the NALM the pulse begins to decrease in width due to the negative total dispersion of loop fiber 2. Depending upon the length of fiber 2, the decrease in width of the pulse will continue through the entire length of fiber 2 or the pulse will begin to increase in width after the negative dispersion of fiber 2 has canceled the width increasing effect of positive dispersion fiber 4. In addition to the oscillation in width due to the total dispersion of respective fibers 2 and 4, for either length of fiber 2 the varying-soliton RZ pulse will be reshaped by the NALM as described above.

The action of the dispersion compensating optical regenerator in accord with the invention is to cause the signal pulses to oscillate in width, (as described immediately above) amplitude, (pulse amplitude decreases when the pulse traverses the fiber and the pulse is increased in amplitude by the amplifiers), and in shape, (the original shape being changed due to the several sources of noise, dispersion, and attenuation, and then recovered in the NALM or NOLM).

In one choice of respective relative lengths of the positive and negative dispersion fibers, the signal pulses return to their original width at the halfway point of each of the respective fibers. In this embodiment of the invention the respective lengths of fibers 2 and 4, $L_t$ and $L_{loop}$, are determined by the total dispersion of each of the fibers $D_t$ and $D_{loop}$, and the desired average dispersion of the span $<D>$, the span being defined as the sum of the respective lengths of fibers 2 and 4. The equation relating these quantities is, $$L_{loop} = (D_t - <D>)L_t / (<D> - D_{loo})).$$

EXAMPLE 1

A typical span including a dispersion compensating optical regenerator in accord with the invention is one in which the desired average dispersion of the span, $<D>$, is 0.05 ps/nm-km, the dispersion of fiber 2, $D_t$, is 17 ps/nm-km and the length, $L_t$ is 80 km, and the dispersion of fiber 4, is −85 ps/nm-km. The length of fiber 4, $L_{loop}$, is to be determined. Substituting into the equation for $L_{loop}$, one finds, $L_{loop}=$ 15.94 km.

The fact that the average span dispersion is maintained low due to dispersion compensation between fibers 2 and 4 results in lower Gordon-Haus timing variation (jitter) and improves signal to noise ratio at the receiver. In addition, the benefits and advantages that result from the signal pulse oscillations, for example those that the pulses would undergo in the dispersion compensating optical regenerator of example 1, are significant. The alternate increasing and decreasing of the pulse width provides a larger effective pulse width and so allows large spacing of the optical amplifiers without creating dispersive waves. In the case of non-linear RZ pulses such as varying-solitons, the inter-pulse interaction can be reduced by choosing the oscillation strength, $\gamma$, to be in the range 3 to 20, where $\gamma=2(\beta_t L_t - \beta_{loop} L_{loop})/T^2$ and $\beta_t$ is the group velocity dispersion (total dispersion) of positive dispersion fiber 2, $\beta_{loop}$ is the group velocity dispersion of the negative fiber 4, and $\pi$ is the full-width-at-half-maximum-amplitude of the pulse at launch. A preferred range for $\gamma$ is 3 to 5. Optimum $\gamma$ for varying-soliton interactions is 3.52. Gaussian pulses are the stable pulse shape for the dispersion compensating optical regenerator operating within the $\gamma$ range 3 to 20. Gaussian pulses have their characteristic smaller optical intensity tails which serve to reduce interactions between neighboring pulses (varying-solitons). The width oscillation of the varying-soliton signal pulses also average out Fourier terms in the pulse tails further reducing the interaction of neighboring pulses. Further, the high local dispersion in each of fibers 2 and 4 causes the non-linear RZ pulses, such as varying-soliton pulses, to rapidly sweep through one another, thereby limiting the interaction time between pulses in different, particularly adjacent, channels. Thus, the amount of non-linear four wave mixing (FWM) and cross phase modulation (XPM) are reduced. This is especially important for the operation of the NOLM/NALM. Prior art embodiments of NOLM/NALMs are single channel devices because inter-channel nonlinearities (FWM and XPM) significantly degrade the performance of the nonlinear optical switching of the loop. The embodiments of this invention will not suffer from this problem and may be used for multi-signal channels.

Considering the overall system length, having a plurality of the dispersion compensating optical regenerators in accord with the invention, the signal pulse width oscillation causes signal pulses in adjacent channels to sweep back and forth through one another many times, thereby increasing the interaction length. An increase in interaction length serves to average out power fluctuations caused by distributed loss (fiber attenuation) and discrete amplification.

Thus, the non-linear RZ pulses (varying-solitons) which result from use of the dispersion compensating optical regenerator in accord with the invention, afford superior means for transmitting information through optical waveguide fibers as compared to the ideal soliton configuration in which the system design is directed to forming spatial and temporal invariant soliton pulses.

In addition to the length of the negative dispersion fiber length, and the oscillation strength, one needs to know the amplifier gain required in the dispersion compensating optical regenerator in accord with the invention. The desired configuration is one in which the gain of the dispersion compensating optical regenerator is equal to the sum of fiber losses and NALM or NOLM insertion loss. The regenerator balances the system loss and gain.

EXAMPLE 2

Using the configuration of example 1, the desired gain may be calculated as follows. A typical attenuation coefficient of fiber 2 is 0.20 dB/km and that of fiber 4 is 0.40 dB/km. The insertion loss in the NALM or NOLM coupler is typically 0.5 dB. Using the respective lengths $L_t$=80 km and $L_{loop}$=15.94 km, the desired amplification is 22.9 dB to balance the regenerator and transmission fiber losses. This amplification can be provided by $G_{pre}$ the gain of the pre-amplifier 14, $G_{loop}$ the gain of the loop amplifier 10 in the case of a NALM, and $G_{post}$ the gain of the post-amplifier 16. The total gain provided by the amplifiers in this case is, $$22.9 = G_{pre} + G_{loop} + G_{post}.$$

In the case of the NALM, desired gain provided by the pre-amplifier 14 and the loop amplifier 10 is sufficient to produce a phase shift in the NALM of 180 degrees ($\pi$ radians). Using an equation known in the art and explained fully in N. J. Doran and David Wood, Optics Letters, v. 13, n. 1, p. 56, (1988), the desired phase shift may be expressed as:

$$\pi = (2\pi n_2 L_{eff} P_{in} G_{pre}/\lambda A_{eff})(B(1+G_{loop})-1),$$

where $n_2$ is the non-linear coefficient, $L_{eff}$ the effective length is given by $(1-\exp(\alpha_{loop}-1))$, where $\alpha_{loop}$ is the loop attenuation coefficient, $P_{in}$ in the peak power input to the dispersion compensating optical regenerator, and B is the power splitting ratio of coupler 6. The above equation may be solved in terms of $G_{loop}$. Using the equation for $G_{loop}$, where $L_{loop}$=15.94 km, $\alpha_{loop}$=0.4 dB/km, $n_2$=3.0×10$^{-20}$ m$^2$/W, $A_{eff}$=25 $\mu$m$^2$, and B=0.5 (the phase shift is solely due to the asymmetric location of the loop amplifier) one obtains:

$$G_{loop} = 2((0.077/P_{in}G_{pre})+1)-1,$$

from which one may choose the loop and the pre-amplifier gain based upon actual or target $P_{pin}$. A launch power into the system of 0 dBm is suitable for purposes of the example which in this case provides an input power of −16 dB to the regenerator. Assuming peak power is ten times average power and using the convention 0 dBm=1 mW, $P_{in}$=0.25 mW. In the case where a pre-amplifier is not used, $G_{pre}$=1 and $G_{loop}$=2.1 dB so that the post amplifier must provide a gain of 20.8 dB.

EXAMPLE 3

Using the same parameter values as in example 2, one may calculate the required splitting ratio for the case where there is no amplifier in the loop and the asymmetry of the loop coupler provides the difference in amplitude of the counter propagating pulses in the loop. In this case, the equation for $G_{loop}$ is solved for B, where $G_{loop}$ is set equal to 1. Upon substitution of the given parameters, one finds, B=((0.077/$P_{in}G_{pre}$)+1)/2. For the case of no pre-amplifier ($G_{pre}$=1), B=0.65. If a pre-amplifier is used and provides $G_{pre}$=3 dB, then B=0.52.

It is desirable to maintain small the asymmetry in the loop, whether the asymmetry is due to the loop coupler or a loop amplifier, consistent with the desired Tr phase shift for optimum switching of pulse power through the loop. A smaller asymmetry will cause less temporal pulse distortion in the loop thereby providing for more effective constructive interference at the coupler after the pulses have traversed the loop. An added benefit accrued from the use of nonlinear RZ pulses or varying-solitons, is that the temporal distortion criteria may be greater in the varying-soliton, relative to that for ideal solitons, without loss of power switched through the loop mirror.

In FIG. 3 is illustrated an example of a telecommunication system made using the dispersion compensating optical regenerator in accord with the invention. The illustration in FIG. 3 shows the amplifiers as being optical fiber amplifiers (such as erbium doped fiber amplifiers) being pumped by laser light coupled into the fiber circuit by appropriate couplers. In addition, FIG. 3 shows only a single regenerator in accord with the invention together with transmission fiber 4 that transmits the filtered and dispersion compensated pulses from the regenerator to receiver 22. It will be understood that a typical telecommunication system typically includes a plurality of dispersion compensating optical regenerator in accord with the invention. However, the action of the regenerators is repetitive so that one need only explain the operation of one such regenerator. RZ signal pulses are launched into fiber 4 from transmitter 20. In the positive dispersion fiber 4, the RZ pulses behave as varying-solitons. The varying-soliton pulses are amplified at pre-amplifier 14 which is pumped by a pump laser (not shown) coupled to fiber 4 via couple 24. The varying-soliton pulses are divided into counter-propagating pulses in negative dispersion fiber 2 by coupler 6. The counter-propagating varying-solitons are amplified by asymmetrically placed loop amplifier 10 which is pumped by a pump laser (not shown) coupled into fiber 2 via coupler 24. The counter-propagating signal pulses are phase shifted by Tr radians in the NALM. The phase shift does not have to be exactly $\pi$ radians to achieve coupling of the signal out of the loop mirror. However the switching of the varying-soliton pulses through the NALM is most efficient when the relative phase shift is $\pi$ radians. A tolerance of +/−10% about the desired $\pi$ radian phase shift is acceptable. In addition to phase shifting the counter-propagating pulses relative to one another, the loop mirror serves its known purpose of filtering out lower amplitude noise thereby restoring the original pulse shape. The source of the amplitude noise can be either amplified spontaneous emission from the EDFAs or Raman amplifiers or dispersive waves generated from frequency chirp in the transmitter, polarization mode dispersion or imperfections in the dispersion map. Because fiber 2 of the loop has a negative dispersion, the varying soliton signals are dispersion compensated as well. A typical selection of respective lengths and dispersions of fibers 4 and 2, brings the varying soliton pulse back to its original shape near the middle of each length of positive and negative dispersion waveguide fiber. The dispersion compensated, filtered varying-soliton pulses are coupled out of the NALM by coupler 6 and are transported through post amplifier 16 (pumped by a pump laser not shown via coupler 24) and into fiber 4 which is optically connected to receiver 22.

In summary, the dispersion compensating optical regenerator in accord with the invention is suited for use in upgrading systems which use non-linear RZ pulses in that the variation of the pulses that occur as the pulse traverses the regenerator provide for beneficial dispersion effects and reduces impact of pulse collisions or interactions. The dispersion compensating optical regenerator in accord with the invention is compatible with system designs which place the compensation waveguide fiber in the center of the system spans.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

What is claimed is:

1. A dispersion compensating optical regenerator for use in a waveguide fiber telecommunications system comprising:

a first optical waveguide fiber having a positive total dispersion and a first length;

a second optical waveguide fiber for compensating dispersion of said first optical waveguide fiber, said second optical waveguide fiber having a second length and a negative total dispersion and being incorporated into a loop mirror, wherein said second optical waveguide fiber carries counter-propagating varying-soliton signals in the loop mirror;

phase shifting means incorporated in the loop mirror to produce a phase shift between the counter-propagating varying-soliton signals in the loop mirror, the phase shift produced being sufficient to cause varying-soliton signals to be coupled out of the loop mirror; wherein, the respective first and second lengths multiplied by the respective positive and negative total dispersions of the optical waveguide fibers provide respective dispersion products that add algebraically to provide an average total dispersion over the total length of optical waveguide fiber of the optical regenerator and said dispersion products are chosen to provide an average total dispersion of said dispersion compensating optical regenerator that is within a pre-selected range.

2. The optical regenerator of claim 1 wherein the average dispersion is within the pre-selected range of 0.01 ps/nm-km to 5 ps/nm-km.

3. The optical regenerator of claim 1 wherein the average dispersion is within the pre-selected range of 0.1 ps/nm-km to 1 ps/nm-km.

4. The optical regenerator of claim 1 wherein an oscillation strength is defined as $2(\beta_t L_t - \beta_{loop} L_{loop})/T^2$, wherein $\beta_t$ is the group velocity dispersion of positive dispersion fiber 2, $\beta_{loop}$ is the group velocity dispersion of the negative fiber 4, and T is the full-width-at-half-maximum-amplitude of the pulse at launch and is in the range of 3 to 20.

5. The optical regenerator of claim 4 wherein the oscillation strength is in the range 3 to 5.

6. The optical regenerator of claim 1 wherein said phase shifting means is an asymmetrical coupler incorporated in the loop mirror for dividing varying-soliton signals input to the loop mirror into counter-propagating varying-soliton signals of different amplitude.

7. The optical regenerator of claim 1 wherein said phase shifting means is an optical amplifier optically coupled in series arrangement into the waveguide fiber of the loop mirror at a point along the length of the waveguide fiber which is asymmetrically located with respect to the waveguide fiber length.

8. The optical regenerator of claim 1 wherein said phase shifting means is a Raman amplifier.

9. The optical regenerator of any one of claims 6, 7, or 8 wherein the phase shifting means provides a phase shift between the counter-propagating varying-soliton signals of 180 degrees ($\pi$ radians).

10. The optical regenerator of claim 7 wherein the respective amplitudes of the counter propagating varying-soliton signals are substantially equal before reaching the optical amplifier.

11. The optical regenerator of claim 7 wherein said optical amplifier has sufficient gain to offset signal power lost in traversing the loop mirror.

12. The optical regenerator of claim 1 wherein the phase shifting means is a combination of an asymmetrical coupler incorporated in the loop mirror for dividing varying-soliton signals input to the loop mirror into counter-propagating signals of different amplitude and an optical amplifier optically coupled in series arrangement into the waveguide fiber of the loop mirror at a point along the length of the waveguide fiber which is asymmetrically located with respect to the waveguide fiber length.

13. The optical regenerator of claim 12 further including a polarization controller coupled in series arrangement into the loop mirror.

14. The optical regenerator of claim 12 wherein the combination of phase shifting means provides a phase shift between the counter-propagating varying-soliton signals of 180 degrees ($\pi$ radians).

15. The optical regenerator of claim 1 wherein said second optical waveguide fiber has a negative total dispersion in the range of $-70$ ps/nm-km to $-100$ ps/nm-km.

16. The optical regenerator of claim 13 wherein said second optical waveguide fiber has an effective area in the range 20 $\mu m^2$ to 40 $\mu m^2$ and a non-linear refractive index not less than $2\times10^{-20}$ $m^2$/W.

17. The optical regenerator of claim 16 wherein the negative total dispersion is in the range $-80$ ps/nm-km to $-90$ ps/nm-km, the effective area is in the range 20 $\mu m^2$ to 30 $\mu m^2$, and the non-linear refractive index is in the range 2.5 $m^2$/W to 4 $m^2$/W.

18. The optical regenerator of claim 1 further including a preamplifier optically coupled to the regenerator to increase the amplitude of varying-soliton signals propagating toward said preamplifier and on toward said loop mirror such that the signal amplitude is above the threshold amplitude at which the signal undergoes self phase modulation.

19. The optical regenerator of claim 1 further including a post-amplifier to amplify the signal back to the system designed launched power level.

20. An optical waveguide telecommunications system comprising:

an optical signal transmitter;

an optical signal receiver;

a length of optical waveguide fiber optically coupled between said optical signal transmitter and said optical signal receive; and, incorporated into said length of optical waveguide fiber, an optical regenerator including a first optical waveguide fiber having a positive total dispersion and a first length;

a second optical waveguide fiber for compensating dispersion of said first optical waveguide fiber, said second optical waveguide fiber having a second length and a negative total dispersion and being incorporated into a loop mirror, wherein said second optical waveguide fiber carries counter-propagating varying-soliton signals in the loop mirror;

phase shifting means incorporated in the loop mirror to produce a phase shift between the counter-propagating varying-soliton signals in the loop mirror, the phase shift produced being sufficient to cause varying-soliton signals to be coupled out of the loop mirror; wherein, the respective first and second lengths multiplied by the respective positive and negative total dispersions of the optical waveguide fibers provide respective dispersion products that add algebraically to provide an average total dispersion over the total length of optical waveguide fiber of the optical regenerator and said dispersion products are chosen to provide an average total dispersion of said dispersion compensating optical regenerator that is within a preselected range.

21. The optical waveguide fiber telecommunications system of claim 20 wherein said phase shifting means is selected from the group consisting of an erbium-doped fiber optical amplifier, a Raman optical amplifier and an asymmetrical coupler.

22. The optical waveguide fiber telecommunications system of claim 20 wherein said phase shifting means provides a phase shift in the optical varying-soliton signals of 180 degrees ($\pi$ radians).

* * * * *